(12) United States Patent
Kim (10) Patent No.: US 6,850,394 B2
(45) Date of Patent: Feb. 1, 2005

(54) APPARATUS AND METHOD FOR DETERMINING MIS-WIRING IN A GROUND FAULT CIRCUIT INTERRUPTER

(75) Inventor: Byung-Kook Kim, Busan (KR)

(73) Assignee: Cheil Electric Wiring Devices Co., Busan (KR)

( * ) Notice: Subject to any disclaimer, the term of this patent is extended or adjusted under 35 U.S.C. 154(b) by 225 days.

(21) Appl. No.: 10/226,529

(22) Filed: Aug. 23, 2002

(65) Prior Publication Data

US 2004/0037018 A1 Feb. 26, 2004

(51) Int. Cl.$^7$ .............................................. H02H 3/14
(52) U.S. Cl. ...................................................... 361/42
(58) Field of Search .......................... 361/43, 93.1, 49, 361/42

(56) References Cited

U.S. PATENT DOCUMENTS

| | | | |
|---|---|---|---|
| 3,473,091 A | 10/1969 | Morris et al. .................. | 317/18 |
| 3,506,906 A | 4/1970 | Nestor .......................... | 321/18 |
| RE28,716 E | 2/1976 | Montz ....................... | 317/18 D |
| 3,963,959 A | 6/1976 | Howell ........................... | 317/9 |
| 3,973,171 A | 8/1976 | Howell ..................... | 317/18 D |
| 4,001,646 A | 1/1977 | Howell ..................... | 317/18 D |
| 4,180,841 A | 12/1979 | Engel ........................... | 361/45 |
| 4,280,162 A | 7/1981 | Tanka et al. ................... | 361/45 |
| 4,409,574 A * | 10/1983 | Misencik et al. ............. | 335/18 |
| 4,574,324 A | 3/1986 | Packard ........................ | 361/46 |
| 4,688,133 A | 8/1987 | Freeman ....................... | 361/45 |
| 5,477,412 A * | 12/1995 | Neiger et al. .................. | 361/45 |
| 5,510,945 A | 4/1996 | Taylor et al. .................. | 361/45 |
| 5,517,165 A * | 5/1996 | Cook ........................... | 335/18 |
| 5,541,800 A * | 7/1996 | Misencik ..................... | 361/45 |
| 5,600,524 A | 2/1997 | Neiger et al. .................. | 361/42 |
| 5,638,243 A | 6/1997 | Torezan et al. ............... | 361/42 |
| 5,661,623 A | 8/1997 | McDonald et al. ........... | 361/42 |
| 5,706,155 A | 1/1998 | Neiger et al. .................. | 361/45 |
| 5,729,417 A | 3/1998 | Neiger et al. .................. | 361/45 |
| 5,757,598 A | 5/1998 | Aromin ........................ | 361/49 |
| 5,963,408 A | 10/1999 | Neiger et al. .................. | 361/45 |
| 6,052,265 A * | 4/2000 | Zaretsky et al. .............. | 361/42 |
| 6,052,266 A | 4/2000 | Aromin ........................ | 361/49 |
| 6,111,733 A * | 8/2000 | Neiger et al. .................. | 361/42 |
| 6,226,161 B1 | 5/2001 | Neiger et al. .................. | 361/45 |
| 6,252,407 B1 | 6/2001 | Gershen ..................... | 324/509 |
| 6,282,070 B1 | 8/2001 | Ziegler et al. ................ | 361/42 |
| 6,522,510 B1 * | 2/2003 | Finlay et al. ................. | 361/42 |
| 6,590,753 B1 * | 7/2003 | Finlay .......................... | 361/42 |
| 6,628,486 B1 * | 9/2003 | Macbeth ...................... | 361/42 |
| 6,697,238 B2 * | 2/2004 | Bonilla et al. ................ | 361/42 |

OTHER PUBLICATIONS

National Semiconductor Jun. 1992, LM1851 Ground Fault Interrupter, © 1995 National Semiconductor Corporation.
S. Goldwasser, G.F.C.I., excerpts from: Sci.Electronics.Repair FAQ:http://www.repairfaq.org/.

* cited by examiner

Primary Examiner—Brian Sircus
Assistant Examiner—Zeev Kitov
(74) Attorney, Agent, or Firm—Morgan, Lewis & Bockius LLP (57) ABSTRACT

A GFCI mis-wiring detector includes a set of input terminals for an AC source, and a set of output terminals for an AC load. The set of output terminals are conductively connected to the set of input terminals. A GFCI circuit has one or more switches that selectively interrupt the connection between the set of input terminals and the set of output terminals when a ground fault occurs. A mis-wiring detection circuit causes the one or more switches of the GFCI circuit to open when the AC source is electrically coupled to the set of output terminals for a first time interval, even if there is no imbalance in the current flow. Additionally, a suppression circuit suppresses operation of the mis-wiring detection circuit when the AC source is electrically coupled to the input terminals for a second time interval. The second time interval is less than the first time interval.

28 Claims, 4 Drawing Sheets

APPARATUS AND METHOD FOR DETERMINING MIS-WIRING IN A GROUND FAULT CIRCUIT INTERRUPTER

The present invention relates generally to ground fault circuit interrupters (GFCIs), and particularly to an apparatus and method for detecting when an AC source is improperly wired to the output terminals of a GFCI.

BACKGROUND OF THE INVENTION

GFCI devices are utilized to interrupt a circuit path, typically at an AC receptacle, in response to the detection of a ground fault condition at an AC load. The input to an AC receptacle is generally an AC source (also called an AC line), and has two sides—the "hot" side (also sometimes called the "line" side), and the "neutral" side. A ground fault typically occurs when a short-circuit is created between the hot side of an AC source and an earth ground. For example, a ground fault condition results when a person comes into contact with the hot side of the AC load and an earth ground at the same time, a situation which can result in serious injury.

Typically, a GFCI device detects this condition by using a sensing transformer or wire coil to detect an imbalance between the currents flowing in the hot and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the AC load.

In other instances, a ground fault may arise from the neutral conductor being grounded. This type of ground fault is dangerous because, if a person comes into contact with the hot side of the AC load when a grounded-neutral fault exists, a portion of the current flowing through the person will find a return path through the neutral-ground fault, potentially reducing the current imbalance in the hot and neutral conductors below the detection threshold. In other words, despite the hot-to-ground fault that is causing the person to be electrocuted, a GFCI device with a grounded-neutral side might not interrupt the circuit as intended.

A neutral-to-ground fault also presents direct detection problems. Because the neutral conductor is already at or near ground potential, this type of ground fault condition (i.e., a grounded-neutral fault) is difficult to detect at the sensing transformer because the neutral-to-ground fault may not cause a sufficient leakage current, or a current imbalance. Some GFCI detectors remedy this issue by providing a second transformer—a grounded-neutral transformer—which, when a grounded-neutral fault occurs, becomes magnetically coupled to the sensing transformer through the neutral conductor. The grounded-neutral condition is detected by providing an oscillating signal to the grounded-neutral transformer, usually by connecting the grounded-neutral transformer to the AC power source through an appropriate circuit, or by using a separate oscillator circuit. Because the neutral conductor acts as a shorted or low-impedance one-turn winding between the two cores of the transformers, the oscillations appear as an imbalance at the sensing transformer, and the GFCI device trips the circuit accordingly.

Although GFCI devices are commonly integrated into wall-mounted AC receptacles, GFCI devices have been provided in various forms, including portable or line cord devices and central units which provide protection for the AC wiring throughout a structure. A typical receptacle configuration consists of a housing adapted to be received within a standard electrical box, with a pair of standard two- or three-prong AC outlets, a test pushbutton and a reset pushbutton accessible through the front of the housing. Also accessible on the outside of the housing are input and output terminals—typically, two pairs of screw terminals. In some receptacle configurations, the input pair of screw terminals (also called the AC line terminals) and the output pair of screw terminals (also called the AC load terminals) are located on the sides of the receptacle, with each pair of terminals having a hot terminal and a neutral terminal positioned across from each other on opposing sides. In other receptacle configurations, the input pair of screw terminals are located on the sides of the receptacle, while the output pair of screw terminals are located on the front of the receptacle between the AC outlets.

The input pair of screw terminals are generally connected to the electrical outlets at the front of the housing via the GFCI circuitry within the housing. The output pair of screw terminals are connected directly in parallel with the contacts of the AC outlets by, for example, an electrical backplane. This output terminals provide the installer with the option of connecting a standard, non-GFCI AC receptacle in parallel with the GFCI receptacle, in order to provide ground fault protection for the standard receptacle without the need to provide a separate GFCI circuit. The standard receptacle may be located remotely from the GFCI receptacle, but will ordinarily be close enough (e.g., in the same room) so that convenient resetting is possible when a ground fault condition occurs.

Unfortunately, there is a problem with the GFCI receptacles described above, because an installer may erroneously connect the incoming AC source to the output terminals of the receptacle rather than to the input terminals. Because of the nature of the internal wiring of the GFCI receptacle, this mis-wiring condition is not easily detected. AC power will still be present at the receptacle outlets and at the output terminals, making it appear that the receptacle is operating normally. If the test pushbutton is depressed, the GFCI circuit within the receptacle will open a set of switches (e.g., a circuit breaker) and the reset button will pop out, again making it appear that the GFCI receptacle is operating normally and providing the desired ground fault protection.

In reality, however, no such protection is being provided because the AC source has been wired directly to the output terminals without passing through the internal circuit breaker of the GFCI device. The GFCI appears to be working properly because of the way the test button is wired—it electrically connects the hot and neutral sides of the electrical connection through the GFCI circuit, causing an unbalanced current flow between the two sides sufficient to trip the GFCI circuit, despite the fact that the AC source current is not normally flowing through the circuit. Thus, this "test" does not detect mis-wiring of the GFCI device.

In the past, GFCI manufacturers have addressed the GFCI mis-wiring problem in different ways. For example, various types of indicators have been utilized to alert an installer that a GFCI receptacle is mis-wired. In one design, GFCI circuits utilize a visual indicator (such as a light-emitting diode) that indicates that the GFCI circuit is operating normally. If the receptacle has been wired properly, the LED is extinguished when a ground fault condition occurs, or when the test button is depressed to simulate a ground fault condition. However, in the event that the receptacle has been mis-wired by connecting the AC source to the load terminals rather than to the input terminals, the LED is not extinguished when a ground fault condition occurs or when the test button is depressed. In other GFCI designs, a visual indicator illuminates directly when a mis-wiring occurs, provided that the switches of the GFCI circuit are in an open position and inversely coupled to an extra, third switch that is closed, thereby powering the visual indicator, which is electrically connected to the load side of the circuit.

In addition to visual indicators, audible alarms have been utilized in GFCI devices to provide a warning signal to an installer when a mis-wiring has occurred. The alarm does not stop sounding the warning until the GFCI circuit has been wired correctly. (Some GFCI circuits also include a timing circuit that triggers the alarm at pre-defined periodic intervals, such as every month, that does not turn off until a user has tested the GFCI circuit by pressing the test pushbutton). In some instances, the mis-wiring alarm has been combined with a tripping mechanism for the GFCI circuit.

Another existing technique to address the mis-wiring problem includes the use of a removable barrier interposed between one of the contacts in the circuit breaker to prevent the reset push-button from popping out when the test button is depressed, if the AC source is mis-wired to the input terminals. By utilizing an extra set of contacts (i.e., three contacts) in the circuit breaker, the removable barrier can block current from flowing from the mis-wired output terminals back through the GFCI circuit when the test button is pressed, but current can still flow through the GFCI when the test button is depressed and the AC source is wired correctly. (However, if the AC source is correctly wired to the input terminals, current cannot flow to the output terminals until the removable barrier (e.g., a mylar strip) is removed. Once removed, the barrier cannot be replaced because of the dangers of having an installer interfere with the GFCI circuit).

For further information on existing mis-wiring detection techniques, U.S. Pat. No. 5,600,524, U.S. Pat. No. 5,706,155, and U.S. Pat. No. 5,638,243 may be helpful.

While these techniques provide some means to determine when a mis-wiring condition has occurred, they tend to add substantial manufacturing complexity, have limited use, and/or require detailed, advance knowledge about the particular operation of the GFCI circuit. Thus, there is a need for a multiple-use GFCI mis-wiring detector that provides a simple notification of a mis-wiring, and that is relatively inexpensive to manufacture.

SUMMARY OF THE INVENTION

In summary, in one embodiment, the invention is a GFCI mis-wiring detector, having a set of input terminals for an AC source, and a set of output terminals for an AC load. The set of output terminals are conductively connected to the set of input terminals. The GFCI mis-wiring detector includes a GFCI circuit having one or more switches that selectively interrupt the connection between the set of input terminals and the set of output terminals when a ground fault occurs.

The GFCI mis-wiring detector further includes a mis-wiring detection circuit that causes the one or more switches of the GFCI circuit to open when the AC source is electrically coupled to the set of output terminals for a first time interval, even if there is no imbalance in the current flow. Additionally, the GFCI mis-wiring detector includes a suppression circuit that suppresses operation of the mis-wiring detection circuit when the AC source is electrically coupled to the input terminals for a second time interval. The second time interval is less than the first time interval.

In another embodiment, the invention is a GFCI mis-wiring detector that includes a GFCI. The GFCI includes a set of input terminals for an AC source, and a set of output terminals for one or more AC loads. There is an electrical interconnection between the set of input terminals and the set of output terminals, and a set of switches interposed between the set of input terminals and the set of output terminals on the electrical interconnection. Thus, a portion of the electrical interconnection extends between the set of input terminals and the set of switches, and another portion of the electrical interconnection extends between the set of switches and the set of output terminals. The set of switches are for selectively interrupting the electrical interconnection.

The GFCI also includes a ground fault detection circuit to detect a ground fault condition at one or more of the AC loads, and a switch actuator to open the set of switches when a ground fault is detected.

The GFCI mis-wiring detector further comprises a mis-wiring detection circuit configured to cause the switch actuator to open the set of switches when the AC source is mis-wired to the set of output terminals, even if there is no ground fault detected. Additionally, the GFCI mis-wiring detector includes a set of mis-wiring detection circuit contacts electrically coupling the mis-wiring detection circuit to a set of output nodes. The output nodes include the set of output terminals, and the portion of the electrical interconnection between the set of switches and the set of output terminals.

In yet another embodiment, the invention is a method of detecting a mis-wiring of a GFCI. The GFCI includes a set of input terminals for electrical connection to an AC source, and a set of output terminals for electrical connection to an AC load. The GFCI further includes a detector for detecting a ground fault condition, and a set of switches that when closed permit an electrical current to flow between the set of input terminals and the set of output terminals, and when open prevents the flow of the electrical current between the sets of input terminals and the set of output terminals.

The method comprises attaching the AC source to the set of output terminals or to the set of input terminals. Next, the set of switches is closed to apply the AC source to both a mis-wiring detection circuit and a suppression circuit. An interrupt signal output is generated from the mis-wiring detection after the AC source has been electrically connected to the set of outputs for a first time interval. The interrupt signal opens the set of switches.

The method also includes generating a suppression signal output from the suppression circuit after the AC source has been electrically connected to the set of inputs for a second time interval which is shorter than the first time interval. The suppression signal suppresses the interrupt signal. Also, a mis-wiring of the AC source to the input terminals is detected by opening the set of switches in response to an unsuppressed interrupt signal that is generated before the second time interval elapses and a suppression signal is generated. The mis-wiring is caused by the mis-wiring detection circuit remaining connected to the AC source when the set of switches is open.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

As used in this patent specification and claims, the following terms have the following meanings:

1. A "ground fault" is either a hot-to-ground fault, or a neutral-to-ground fault, or both such a fault may occur in many different locations including, for example, the AC load, the output terminal, or in the GFCI circuit itself.

2. An "electrical connection," "electrical interconnection," and the like, between, for example, inputs and outputs or any other components, means any form of electrical coupling between the inputs, outputs, and/or any other components. The electrical coupling may be through, for example, conductive wires or traces, and through other components and circuitry including, for example, resistors, capacitors, transistors, and other devices, or any combination thereof.

3. A "conductive connection," "conductive path," and the like, between, for example, inputs and outputs or any other components, means an electrical coupling that permits current to flow, in either direction, or both, between the inputs, outputs, and/or any other components. The conductive coupling may be through, for example, conductive wires and traces, and through other components and circuitry including, for example, resistors, capacitors, transistors, and other devices, or any combination thereof.

Figure 1:
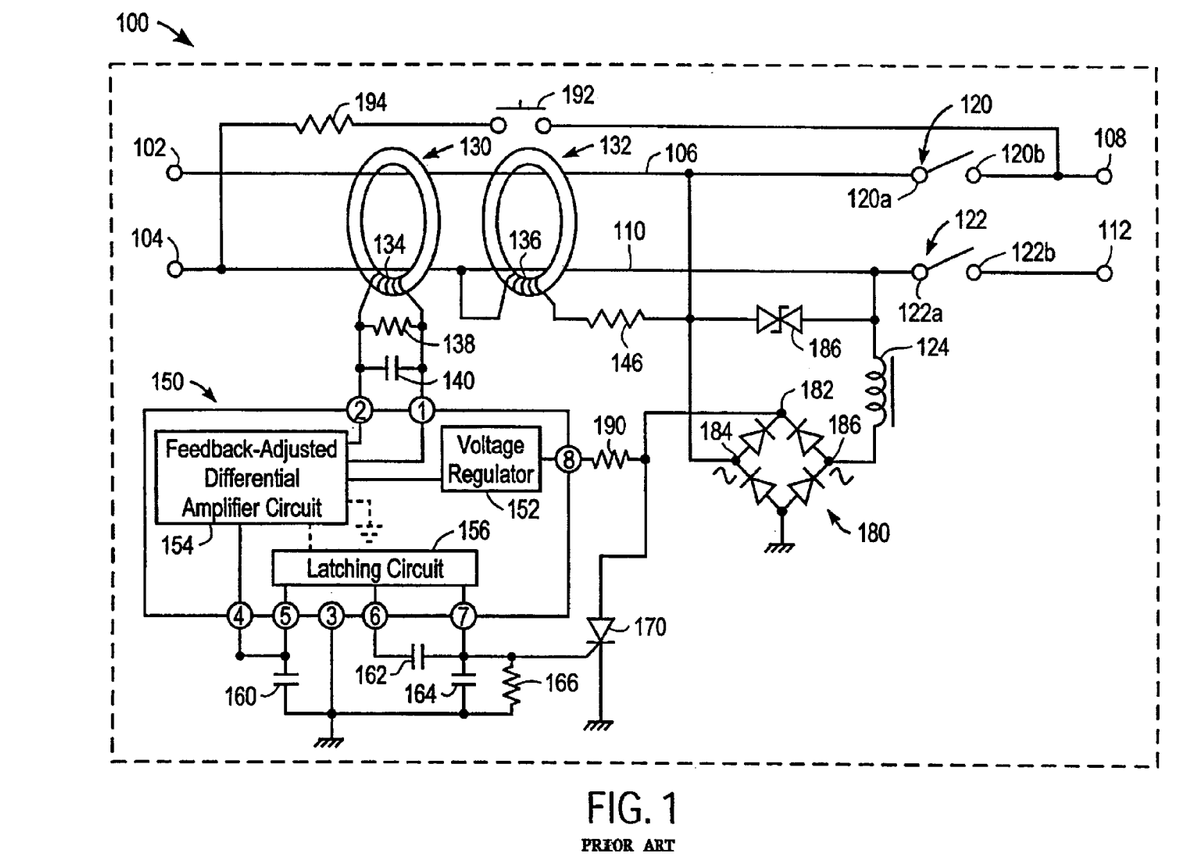
FIG. 1 is a schematic of an example of an existing type of GFCI circuit.

FIG. 1 is a schematic diagram of an existing type of GFCI circuit 100. The GFCI circuit 100 as shown is a typical GFCI circuit arrangement, and is particularly similar to the GF5262 model sold by the Hubbell Corp. of Orange, Conn. However, the invention is not meant to be limited to any particular type of GFCI circuit, and is instead meant to be compatible with any GFCI circuit. A common application of a GFCI circuit, such as the one shown, is to be used in conjunction with an AC receptacle to protect AC loads plugged into the receptacle outlets, as well as any other receptacle outlets placed in parallel with the receptacle containing the GFCI circuit.

GFCI circuit 100 includes a set of input terminals 102, 104 for electrical connection to an AC source (also known as an AC line). In a typical GFCI circuit, the input terminals are screw terminals, although they need not be, and can constitute a variety of types of inputs, so long as electrical connection can be made to the GFCI circuit through the inputs. Input 102 corresponds to the "hot" (also sometimes referred to as the "line" side) of the AC source, and input 104 corresponds to the "neutral" side of the source. A first conductor (or conductive path) 106 connects the hot input terminal 102 to a hot output terminal 108, and a second conductor (or conductive path) 110 connects the neutral input terminal 104 to a neutral output terminal 112. Thus, the GFCI circuit 100 forms an electrical interconnection between the set of input terminals 102, 104 and the set of output terminals 108, 112.

The output terminals 108, 112 can be connected to the hot and neutral contacts of another AC receptacle outlet (not shown). In this way, the output terminals allow the GFCI circuit to be connected in parallel to a standard, non-GFCI receptacle for which ground fault protection is desired, without the need to provide a separate GFCI circuit for the additional receptacle. Additionally, a connection is also made from the first conductor 106 and the second conductor 110, from a position proximate the output terminals, to an electrical backplane (not shown in FIG. 1, but partially shown in FIGS. 4A–C) that connects, in parallel, the output terminals and the receptacle outlets of the receptacle in which the GFCI circuit is housed. In this manner, any AC load plugged into either the receptacle outlets of the integral GFCI receptacle, or the receptacle outlets of an AC receptacle connected in parallel with the integral GFCI receptacle, will be protected by the GFCI circuit.

In an integral AC receptacle and GFCI for protecting the receptacle of the type being described, the input terminals 102, 104 and the output terminals 108, 112 will typically be mounted on the outside of the receptacle housing so that appropriate connections can be made to these terminals by an installer. A pair of two- or three-prong receptacle outlets are typically mounted within the housing, accessible from the front for plugging in AC load devices (e.g., appliances). A ground terminal is also typically mounted on the outside of the receptacle housing, and is connected to the third, ground prong of the receptacle outlets (if the outlets are for three prongs) and to a metal yoke or frame (not shown) in which the receptacle housing is carried.

The conductive paths established by the first and second conductors 106, 110 in FIG. 1 are selectively opened and closed by a first and second sets of electrical contacts, or switches, 120 and 122, respectively, in order to selectively connect and disconnect the input terminals 102, 104 from the output terminals 108, 112 and the electrical backplane/receptacle outlets. In other words, the sets of electrical contacts have an open position that inhibits current flow and a closed position that permits current flow.

The first set of electrical contacts 120 includes first and second contacts 120a and 120b, respectively, and the second set of electrical contacts 122 similarly includes first and second contacts 122a and 122b, respectively. These sets of electrical contacts, constituting switches, form a part of a circuit breaker that is mechanically latched in the closed position during normal operation, and are operated by a RESET pushbutton (not shown in FIG. 1) located on the exterior of the GFCI receptacle housing. When the set of switches are latched in the closed or conducting state, continuous conductive paths exist between the input terminals 102, 104 and the output terminals 108, 112 to deliver power from the AC source to the receptacle outlets (and to any remote receptacle connected to the output terminals as explained above).

When a ground fault condition is detected, a solenoid trip coil 124 is energized and causes the set of switches 120, 122 to open, thereby preventing an electrical shock hazard by immediately and simultaneously removing power from both sides of the output terminals 108, 112. In order to detect a ground fault condition, the GFCI circuit 100 includes a sensing transformer 130 (also referred to as a zero-current transformer) through which the first and second conductors 106 and 110 extend. (Other forms of current-differential or voltage-differential detectors, other than a transformer, can also be utilized to detect a current imbalance across the first and second conductors or other conditions indicative of a ground fault). The secondary winding 134 of the sensing transformer 130 is connected across the input pins 1 and 2 of a GFCI chip 150 (i.e., an integrated circuit), which basically monitors the voltage differential between the inputs and provides a latched high output when the corresponding current imbalance in the conductors exceeds a certain value (configured to be 5 mA or less in the United States, in accordance with U.S. regulations).

GFCI chip 150, as shown, contains three principal circuitry blocks: voltage regulator 152, feedback-adjusted differential amplifier circuit 154, and latching circuit 156. In one embodiment, the particular GFCI chip used is a Hynix GL 7101 Earth Leakage Current Detector chip. However, in other embodiments, the invention may utilize any other type of GFCI chip that detects a current imbalance across the first and second conductors 106 and 110, indicative of a ground fault condition. Examples of such alternative GFCI chips include the Type RV 4145 integrated circuit from Raytheon Company, and the LM1851 Ground Fault Interrupter from National Semiconductor. Alternatively, discrete or integrated components can be used in place of a GFCI chip, such as a differential amplifier and a latching circuit. It will be appreciated by one of skill in the art that there are numerous possible ways to implement logic capable of making this detection.

shown, the GFCI chip 150 receives a DC voltage input at pin 8. The power is provided by the AC source at the input terminals 102, 104, rectified by a full-wave bridge rectifier 180, and limited by 82 kilohm, ½-watt current-limiting resistor 190. This input voltage is regulated by voltage regulator 152, and powers the feedback-adjusted differential amplifier circuit 154 (optional ground input to the feedback-adjusted differential amplifier is shown in phantom). The feedback-adjusted differential amplifier 154 is configured to amplify the voltage differential between pins 1 and 2. This output, provided at pin 4, is tied to pin 5—the input to latching circuit 156.

In the presence of a positive voltage differential output at pin 4, a 0.01 microfarad integrating capacitor 160 begins charging. When the voltage at the integrating capacitor 160 exceeds an internal threshold value for the latch circuit 156, generally greater than the turn-on voltage for the SCR 170 (described below), it is latched by the latch circuit. The output of the latching circuit, provided at pin 7, is also utilized in a feedback loop to the latching circuit via pin 6. Capacitor 162, a 0.01 microfarad capacitor positioned in this feedback path between pins 6 and 7, upgrades noise immunity in the latching circuit 156. Note that, as shown in phantom, the latching circuit 156 may also optionally provide an input to the feedback-adjusted differential amplifier 154.

In operation, the sensing transformer 130 serves as a differential transformer for detecting a current leakage between the hot side of the AC load and an earth ground. In this context, an AC load can be a load directly connected to the receptacle outlets wired in parallel with the output terminals 108, 112; a load connected to the receptacle outlets of a separate AC receptacle wired in parallel with the output terminals; or the separate receptacle itself and associated wiring. It can also be any combination of these possibilities, or multiple AC loads. In other words, the AC load refers to anything downstream of the sensing transformer 130 (this includes some of the GFCI circuitry).

In the absence of a ground fault condition, the currents flowing through the first and second conductors 106 and 110 (i.e., hot and neutral sides of the electrical interconnection formed by the GFCI) will be equal and opposite, and no net flux will be generated in the core of the sensing transformer 130. In the event that a connection occurs between the hot side of the AC load and ground, however, the current flowing through the conductors 106 and 110 will no longer precisely cancel and a net flux will be generated in the core of the sensing transformer 130. This flux will give rise to a potential between the input and output of the secondary winding 134, and, as discussed above, this output is applied to the input pins 1 and 2 of GFCI chip 150. Capacitor 140, a 0.001 microfarad filter capacitor, provides AC coupling for the inputs into the GFCI chip 150, and 4–10 kilohm resistor 138 provides protection for the input of the GFCI chip under severe fault conditions, such as a short circuit between the hot side of the AC load and ground.

Also, an additional transformer 132 serves as a grounded-neutral transformer for detecting current leakage between the neutral side of the AC load and an earth ground. The secondary winding 136 of the grounded-neutral transformer 132 is coupled to the hot and neutral conductors, and hence the AC source, through 32 kilohm current-limiting resistor 146. The current-limiting resistor is configured so that, when no grounded-neutral fault exists, the transformer core becomes saturated at relatively-low voltage levels in the oscillating signal, thus causing minimal voltage swings across the secondary winding 136 (a voltage difference is only induced in the secondary winding when there is changing flux in the core due to non-saturation). It is important that the voltage swings across the grounded-neutral transformer remain muted so that corresponding induced voltage swings across the sensing transformer do not exceed a level that would otherwise indicate a ground fault condition.

When a ground-to-neutral fault occurs, however, a closed circuit loop is formed between the neutral conductor, the inadvertent ground fault, and the neutral-ground connection at the service panel. Thus, the neutral conductor acts as a shorted or low-impedance (e.g., less than two ohms) primary one-turn winding coupling the cores of the sensing transformer 130 and the grounded-neutral transformer 132. This reduces the magnetic flux density in the grounded-neutral transformer below the saturation point, and, resultingly, the voltage across the secondary winding 136 of the grounded-neutral transformer directly tracks the signal across the burden resistor 146. This in turn induces a current in the neutral-ground-neutral closed circuit loop, which causes a corresponding oscillating voltage (although reversed in polarity) to be induced across the secondary winding 134 of sensing transformer 130, just as if a hot-to-ground fault had occurred. This induced voltage is provided as inputs to pins 1 and 2 of GFCI chip 150, and from this point, the operation of the GFCI circuit progresses identical to when a hot-ground fault is detected.

In the absence of a ground fault condition, no output is produced by the GFCI chip 150 at pin 7. Under these circumstances, a silicon controlled rectifier (SCR) 170, connected to the output terminal 182 of the full-wave bridge rectifier 180 is maintained in a non-conducting state. Since the current drawn by the resistor 190 and GFCI chip 150 is not sufficient to operate the solenoid trip coil 124, the solenoid plunger, mechanically attached to the set of switches 120, 122, remains motionless and the switches remain closed. The occurrence of a ground fault condition causes the GFCI chip 150 to output a positive voltage at pin 7, which is applied to the gate terminal of the SCR 170, and which is greater than the turn-on voltage of the SCR, thereby rendering the SCR 62 conducting. This produces a short circuit at the output node 182 of the full-wave bridge rectifier, thereby providing a low-impedance path for current to flow through the solenoid trip coil 124. The resulting movement of the solenoid plunger causes the set of switches 120, 122 to move to the open position (shown in FIG. 1), thereby removing power from the output terminals 108, 112 and, correspondingly, the electrical backplane and receptacle outlets.

Opening of the set of switches 120, 122 has the effect of disconnecting the AC neutral input 186 to the full-wave bridge rectifier 180, thereby removing power from the solenoid trip coil 124 and from the GFCI chip 150. This is desirable in that AC current from the AC source is positively prevented from passing through the SCR 170 after the ground fault condition has occurred, even if the SCR continues to be gated as a result of internal circuit capacitances. A 0.01 microfarad capacitor 164 is connected between the gate and cathode of the SCR 170 to serve as a filter for preventing narrow noise pulses from triggering the SCR. A 3 kilohm resistor 166 discharges the capacitor 164 when the SCR 170 is no longer being gated, and also shunts leakage currents at the gate. The circuit shown in FIG. 1 also includes a 10 mm metal oxide varistor (MOV) 186 connected across the input terminals of the full-wave bridge rectifier 180, in order to protect the GFCI chip 150 and SCR 170 from transient voltage surges above a clamping voltage.

In order to test the GFCI circuit for proper operation, a test circuit comprising a pushbutton TEST switch 192 connected in series with a 15 kilohm current limiting resistor 194 is connected to the hot conductor 106 at a point on the output-side of the switch 120, and to the neutral conductor 110 at a point on the input-side of the sensing transformer 130. When the TEST switch 192 is momentarily depressed, sufficient current will flow through the resistor 194 to cause an imbalance in the current flowing through the primary winding (i.e., the hot and neutral conductors) of the sense transformer 130. This will simulate a ground fault condition, causing the GFCI chip 150 to produce an output signal at pin 7 that gates the SCR 170 into conduction and thereby momentarily energizes the solenoid trip coil 124. The resulting movement of the solenoid plunger causes the set of switches 120, 122 to open, as will occur during an actual ground fault condition, and this in turn de-energizes the output terminals 108, 112, the electrical backplane and receptacle outlets, solenoid trip coil 124, and GFCI chip 150. The opening of the set of switches 120, 122 will be evident from the popping out of the RESET pushbutton, which is mechanically interconnected with the switches. If this does not occur, the user or installer is alerted to the fact that the GFCI receptacle is defective and requires repair or replacement.

In the installation of a GFCI receptacle of the type illustrated in FIG. 1, an installer will sometimes erroneously connect the incoming AC source to the output terminals 108, 112 rather than to the input terminals 102, 104. This reverse wiring, or mis-wiring, is not readily apparent to the installer or to the ultimate end-user, because AC power will exist at the output terminals, and hence at the receptacle outlets, and will thereby make it appear that the receptacle is operating normally. In addition, when the TEST pushbutton 192 is depressed, a current will flow through the test circuit and through the portion of the neutral conductor 110 that passes through the sensing transformer 130 and grounded-neutral transformer 132, as a result of the AC potential applied across the output terminals 108, 112. The resulting current imbalance between the hot and neutral sides of the electrical interconnection (i.e., first conductor 106 and second conductor 110) will be detected by the sense transformer 130 and the set of switches 120, 122 will open, again making it appear that the GFCI receptacle is operating normally.

In reality, however, no ground fault protection is being provided because the incoming AC source is wired directly to the output terminals 108, 112, rather than indirectly to the output terminals through the electrical interconnection and the set of switches 120, 122. The mis-wiring condition can be detected if an operating electrical load is plugged into a GFCI receptacle outlet when the TEST pushbutton 192 is depressed, since the load will continue to be energized even after the RESET button has popped out. However, neither the installer nor the end-user can be relied upon to test the GFCI receptacle in this manner, since the popping out of the RESET button is ordinarily taken as a sufficient indication that the receptacle is operating normally.

Figure 2:
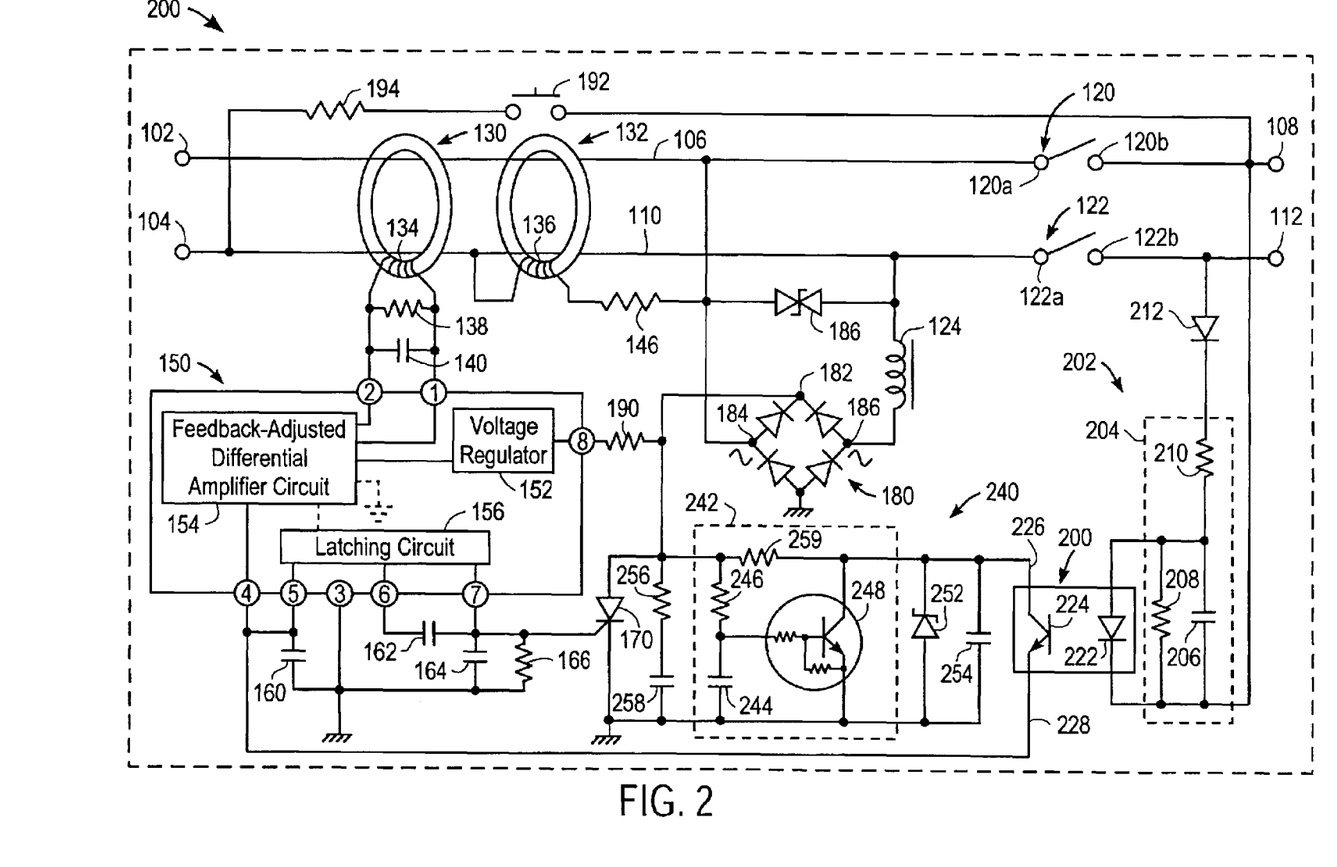
FIG. 2 is a schematic of a GFCI circuit and a mis-wiring detector, in accordance with one embodiment of the present invention.

As shown in FIG. 2, a simple and effective indication of a reverse wiring condition is obtained by providing a mis-wiring detection circuit and a suppression circuit in a GFCI circuit with mis-wiring detector 200. An example of a mis-wiring detection circuit is shown generally at 202, and an example of a suppression circuit is shown generally at 240, in accordance with one embodiment of the invention. The purpose of the mis-wiring detection circuit 202 is, whenever the AC source is electrically connected to the output nodes 108, 112, to charge up and send an interrupt signal to the SCR 170 (via the GFCI chip 150) that causes the set of switches 120, 122 to open through the sequence of events described above for a ground fault.

This opening of switches 120, 122 is the desired result when the AC source is mistakenly wired to the output terminals 108, 112. It is not desirable when the AC source is correctly wired to the input terminals 102, 104, but if the AC source is electrically available at the output terminals 108, 112 because the set of switches 120, 122 are closed, the mis-wiring detection circuit 202 would still force the switches open. In this instance, however, the suppression circuit suppresses operation of the mis-wiring detection circuit, such that no interrupt signal is sent. If the set of switches 120, 122 are closed when the AC source is correctly wired to the input terminals 102, 104, the suppression circuit must suppress the mis-wiring detection circuit before it can send an interrupt signal. This is achieved in the embodiment shown in FIG. 2 by employing a shorter time interval for activating the suppression circuit than for activating the mis-wiring detection circuit.

The mis-wiring detection circuit 202 is electrically connected to the first and second conductors 106, 110 (also referred to as the electrical interconnection), between (and/or directly connected to) the secondary contacts 120b, 122b of the set of switches 120, 122, and the output terminals 108, 112. This portion of the electrical interconnection and the output terminals 108, 112 may also be considered a set of output nodes. When an electrical connection is made between the AC source and the output terminals 108, 112, whether directly by a mis-wiring, or indirectly by a proper wiring of the AC source to the input terminals 102, 104 and the set of switches 120, 122 are closed, a current path is created between the hot and neutral sides through the mis-wiring detection circuit 202.

The current path is partially rectified through 1N4007 rectifier diode 212. This current flow begins charging a charging circuit 204, also referred to as a long-delay circuit. In the long-delay circuit, the 47 microfarad, 6.3 volt capacitor 206 begins charging via 68 kilohm, ½ watt resistor 210. When the long-delay circuit reaches the threshold voltage of the TLP181 opto-isolator 220 from Toshiba, comprising light-emitting diode 222 (LED) and phototransistor 224, the opto-isolator is triggered. In other words, the voltage across LED 222 exceeds the turn-on voltage of the LED and is causing sufficient light output to turn on phototransistor 224 by opening its opto-controlled gate. This occurs at a first time interval, established in part by the time constant of the long-delay circuit 204. If the long-delay circuit 204 is charging because the AC source is mis-wired to the output terminals 108, 112 (or the output nodes, as described above), and the set of switches 120, 122 are open, nothing happens when the phototransistor 224 (also called a communicatively-coupled switch) is turned on, because no power is available to the anode 226 of the phototransistor.

However, if the set of switches 120, 122 are then closed (such as when a person pushes the RESET button), power is provided from the output node 182 of the full-wave bridge rectifier 180, across 82 kilohm, ½ watt resistor 250, creating a positive voltage at phototransistor anode 226, which is then outputted as an interrupt signal at the cathode 228. The cathode of the phototransistor is tied to the feedback-adjusted differential amplifier circuit 154 output pin 4 of the GFCI chip 150. Thus, the interrupt signal appears at latching circuit 156 input pin 5 just as if the sense transformer 130 has detected a voltage differential indicative of a ground fault. This then causes the charging of integration capacitor 160 until a latching voltage is exceeded, the latching of the latch circuit 156, the outputting of a SCR-triggering signal at output pin 7, the triggering of the SCR 170, the shorting of the full-wave bridge rectifier 182, the energizing of the solenoid trip coil 124, and, finally, the opening of the set of switches 120, 122 and tripping of the RESET button.

Because the RESET has just popped out again after being pushed, the installer is notified of the mis-wiring, and no special advance knowledge or indicator is required. (In other embodiments, instead of an interrupt signal, other types of notification mechanisms can also be used. For example, a LED can be used to illuminate a "GFCI mis-wiring" sensor). If the installer pushes the RESET button again, the above process repeats, and again it will pop open. Even if the installer does not realize the particular meaning of this event, he or she will understand, at a minimum, that something is defective about the GFCI or its circuitry.

Once the AC source is electrically dis-connected from the output terminals 108, 112 (or the output nodes), the long-delay circuit 204 will discharge through 3.3 kilohm resistor 208.

The mis-wiring detector circuit 202, which works at all times electrical connection is made between the AC source and the output terminals 108, 112 (or the output nodes), must be suppressed when the AC source is correctly wired to the input terminals 102, 104 for the GFCI circuit and mis-wiring detector 200 to work correctly. Thus, the suppression circuit 240 interferes with, or inhibits, operation of the mis-wiring detection circuit 202. The suppression circuit is electrically connected to the output node of the full-wave bridge rectifier 180, and, through the bridge rectifier, is electrically connected to a set input nodes that includes the set of input terminals and the portion of the electrical interconnection between the set of input terminals and the set of switches.

Because it is connected to the full-wave bridge rectifier 180, the suppression circuit 240 operates any time there is a potential between the first and second conductors 106, 110. (In an alternative embodiment, the suppression circuit and the mis-wiring detection circuit only operate when there is a current flow through the first and second conductors to an AC load). Once the bridge rectifier provides a voltage at output node 182, the short-delay circuit 242 begins charging.

Also, when there is a voltage at rectifier output node 182, and the phototransistor 224 has not been triggered by the mis-wiring detection circuit, 4.7 microfarad 6.3 volt capacitor 244 begins being charged by 330 kilohm resistor 246. When the capacitor 244 reaches the threshold voltage of transistor 248 (KRC103M from Korea Electronics Semiconductor in one embodiment), approximately 1.4 volts, after a second time interval, transistor 248 turns on and pulls the phototransistor anode 226 to circuit ground. (Transistor 248 is depicted as having two internal resistors, representing the effective resistance of the transistor). Thus, the mis-wiring detection circuit can no longer output an interrupt signal from phototransistor cathode 228 to the latching circuit 156 input of GFCI chip 150, and its operation is effectively suppressed.

The "trick" to ensuring that the short-delay circuit charges before the long-delay circuit, if AC power is applied simultaneously across the entire electrical connection between input and output terminals (effectively charging both circuits beginning at the same time), is to choose the time constant of the short-delay circuit such that its associated transistor 248 turn-on time (second time interval) is shorter than the phototransistor 220 turn-on time (first time interval). In one embodiment, the second time interval is one-tenth the length of time of the first time interval. This ensures that in a correctly-wired GFCI circuit and mis-wiring detector 200, the suppression circuit will always suppress the operation of the mis-wiring detection circuit 202 before it can undesirably open the set of switches 120, 122.

In one slight variance, if the GFCI circuit and mis-wiring detector 200 is mis-wired, such that the AC source is electrically connected to the output terminals 108, 112, the long-delay circuit 204 of the mis-wiring detection circuit will begin charging as described, whether or not the set of switches 120, 122 are open. However, if the set of switches 120, 122 are closed, the short-delay circuit 242 of the suppression circuit will begin charging as well. Both the short-delay circuit and the long-delay circuit will become fully charged and their associated transistors will turn on, but because the short-delay circuit charges faster than the long-delay circuit, no interrupt signal will be generated at the phototransistor cathode 228.

However, in this instance, the mis-wiring detection circuit 202 should not be suppressed because there is a true mis-wiring. Therefore, if this particular event occurs, an installer must push the TEST button 192, which will cause the imbalance in current flow through the first and second conductors simulating a ground fault, causing the GFCI chip 150 to turn on the SCR 170, tripping the solenoid trip coil 124 and opening the switches 120, 122. Now, capacitor 244 discharges and the transistor 248 turns off. But, the long-delay circuit 204 remains charged as power is still being provided to it, due to the mis-wire.

Thus, at this time, the situation is the same as if an installer had mis-wired the GFCI circuit and mis-wiring detector 200 with the set of switches 120, 122 open. In other words, when the installer attempts to push the RESET button, it will briefly power up the GFCI chip, long enough to trigger the SCR 170, energize the solenoid trip coil 124, and pop open the switches and attached RESET button again, notifying the installer of the mis-wire. Therefore, because of this one circumstance, an installer must always press the TEST button 192 when installing a GFCI circuit and mis-wiring detector 200 (which presumably he or she would do regardless).

The 5.1 volt, ½ watt Zener diode 254 prevents the transistor 248 of the short-delay circuit from being subjected to voltages exceeding the transistor's maximum voltage rating. The 4.7 microfarad, 6.3 volt capacitor 254 filters out the transient that results when the RESET button is pressed, that would otherwise pass through the phototransistor 224 to the latching circuit 156 of the GFCI chip 150, causing a false trip that re-opens the set of switches 120, 122. The 0.01 microfarad capacitor 258 and 100 ohm resistor 256 reduce undesirable dv/dt turn-on of the SCR 170.

The use of an opto-isolator 220 in the present embodiment is particularly advantageous for communicatively coupling portions of the mis-wiring detection circuit 202 and the suppression circuit 240. This is because, when the set of switches are open 120, 122, such as when the GFCI circuit and mis-wiring detector 200 has detected a ground fault and interrupted the circuit, the mis-wiring detection circuit 202 and the suppression circuit 240 are electrically isolated. Were this not true, despite the circuit-interrupting operation of the GFCI portion of the circuitry, there would still be a risk that potentially dangerous current could flow across the suppression circuit to the mis-wiring detection circuit, circumventing the safety cut-off of the GFCI.

The value, placement, and type of the components utilized in the mis-wiring detection circuit 202 and suppression circuit 240 shown in FIG. 2 are merely one exemplary embodiment of the present invention. One of skill in the art will appreciated that there are many other possible configurations that could achieve the same functionality, or utilize the same structures, as set forth in the claims defining the invention. For example, a completely different type of timing mechanism other than charging circuits could be utilized to control when the mis-wiring detection circuit and suppression circuit operate with respect to each other. Similarly, entirely different mechanisms for providing an interrupt signal, and suppressing it, such as ASICs or processors designed to provide these types of outputs, can be employed. Also, other types of detectors, like voltage sensors, can be used to measure current differential across the hot and neutral conductors indicative of a ground fault. Other techniques of detecting a ground fault other than detecting a current imbalance are also within the scope of the invention.

Figure 3:
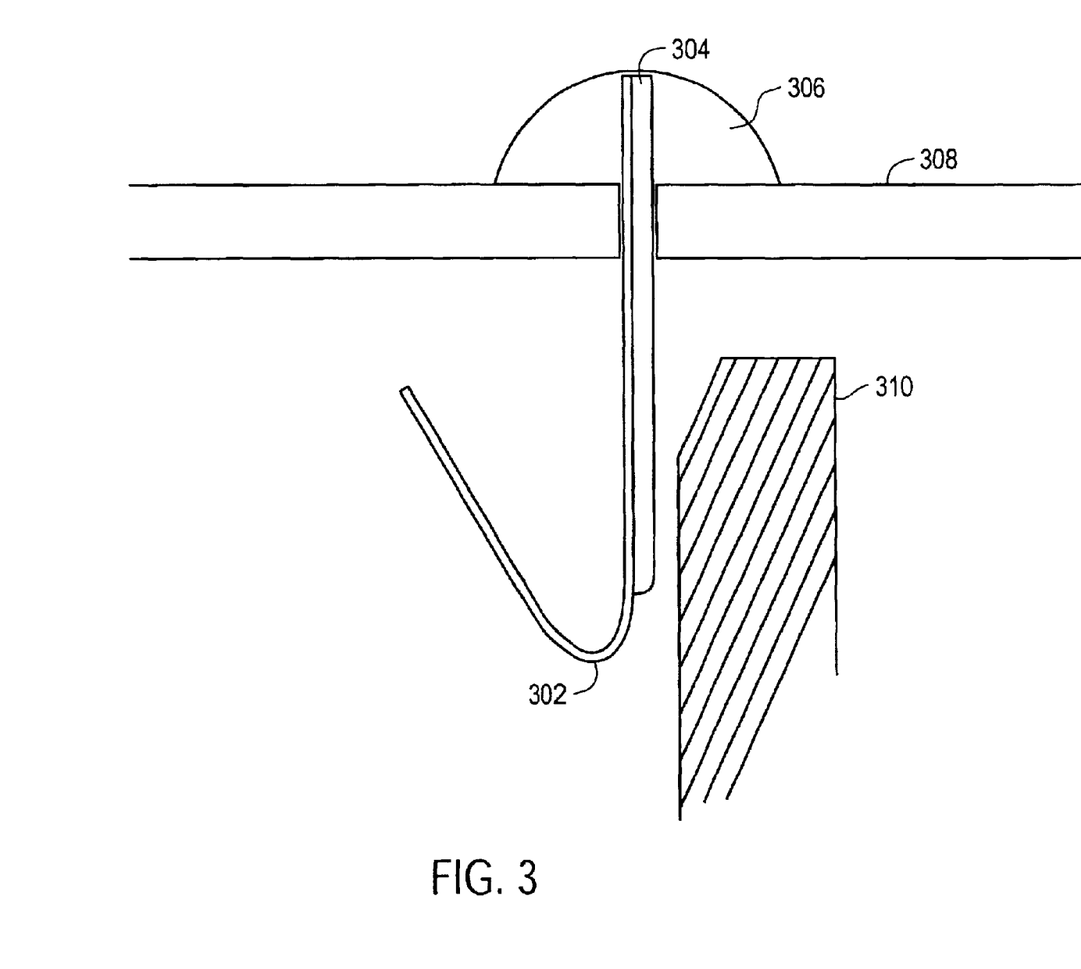
FIG. 3 is a cross-section view of a type of contact used to connect a mis-wiring detection circuit to an electrical backplane (connecting the AC receptacles and the output terminals), in accordance with one embodiment of the present invention.

Referring to FIG. 3, an example of one type of electrical contact that might be used to connect the mis-wiring detection circuit to an electrical backplane is shown. Recall that the electrical backplane interconnects the output terminals 108, 112 and AC outlets of the receptacle. The mis-wiring detection circuit contact 302 is connected at a right-angle to printed circuit board (PCB) 308 by means of an epoxy 306 or other adhesive. The contact 302 is electrically connected to traces (not shown) on the PCB 308 by means of a solder junction 304. The contact has a downwardly- and outwardly-curved end, bent at an acute angle relative to the perpendicularly-mounted contact 302. The purpose of this arrangement is for easy conductive coupling with the electrical backplane, and specifically with the extension arm 310 of the backplane.

Figure 4A:
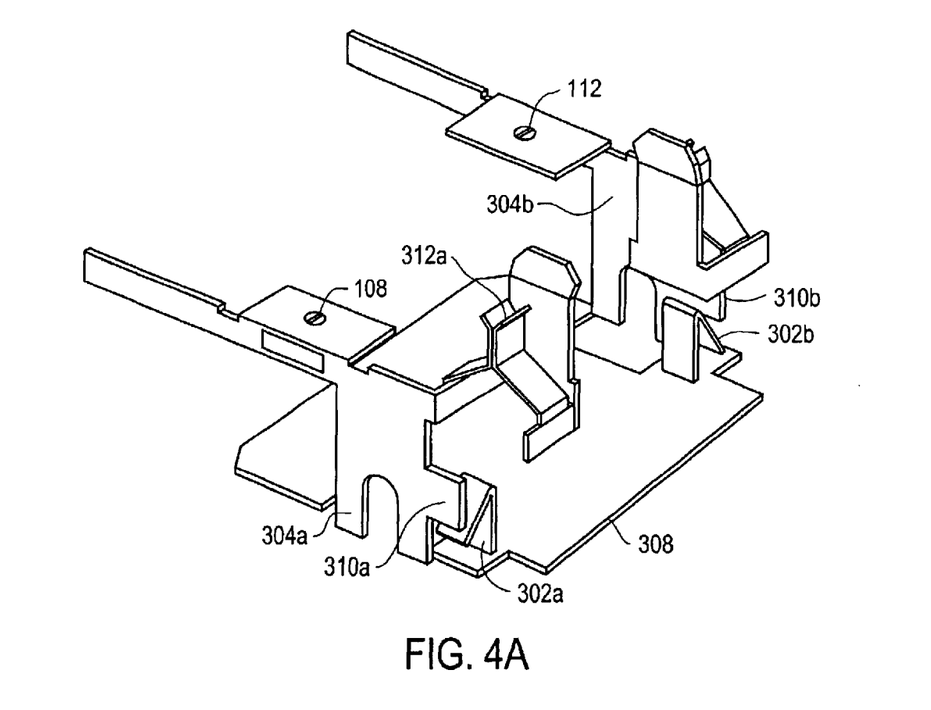
FIG. 4A is a perspective view of one embodiment of the present invention including an electrical backplane connecting the AC receptacles and the output terminals, and contacts of the type shown in FIG. 3, mounted on or proximate to a circuit board, that are used in conjunction with an AC receptacle housing.
Figure 4B:
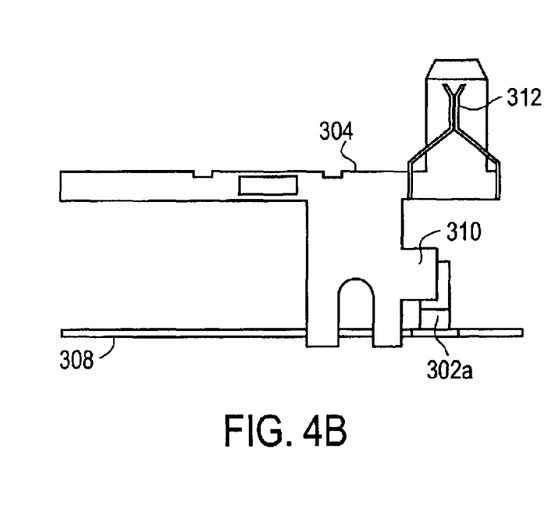
FIGS. 4B–C are cross-sectional views of the embodiment shown in FIG. 4A, viewed from the side and from the front, respectively.
Figure 4C:
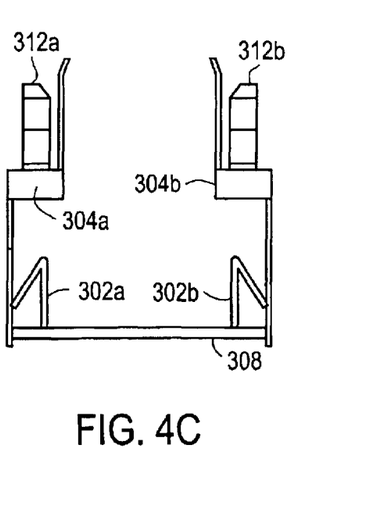

Turning to FIGS. 4A–C, perspective views of a PCB 308, backplanes 304a, 304b, and set of mis-wiring detection circuit contacts 302a, 302b are shown. From these views, it can be seen how the backplanes 304a, 304b easily and conveniently mate with contacts 302a, 302b via extension arms 310a, 310b. Backplane 304a electrically connects the hot side of an AC receptacle outlet (outlet plug mating arms 312a are shown for one side of one plug) and the hot output terminal 108, which may be a screw-type terminal.

Similarly, backplane 304b electrically connects the neutral side of an AC receptacle outlet and the neutral output terminal 112. Typically, the backplanes are mounted in a receptacle housing (not shown) which fits over the PCB 308. Thus, PCB 308 and backplanes 304a, 304b typically constitute separate moving parts. Utilizing easy-coupling contacts 302a, 302b makes conductive coupling with the backplane easier, safer, and more likely to be achieved properly.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A ground fault circuit interrupter for an AC electrical receptacle, comprising first and second input terminals for conductive coupling to the hot and neutral sides, respectively, of an AC Line;

first and second output terminals for conductive coupling to the hot and neutral sides, respectively, of at an AC load;

first and second conductive paths electrically connecting, respectively, the first input terminal to the first output terminal, and the second input terminal to the second output terminal;

first and second sets of electrical contacts interposed, respectively, between the first input terminal and the first output terminal on the first conductive path, and between the second input terminal and the second output terminal on the second conductive path, the first and second sets of electrical contacts having an open position that inhibits current flow and a closed position that permits current flow;

a circuit interrupter configured to cause the first and second sets of electrical contacts to open upon receiving an interrupt signal:

a ground fault detection circuit configured to detect an imbalance in current flow between the first and second conductive path that is indicative of a ground fault condition and, when a ground fault condition is detected, to output an interrupt signal to the circuit interrupter;

a mis-wiring detection circuit configured to output an interrupt signal to the circuit interrupter when the hot and neutral sides of the AC line are conductively coupled to the first and second output terminals, even if there is no imbalance in current flow through the first and second conductive paths, and wherein the mis-wiring detection circuit outputs the interrupt signal to the circuit interrupter when the hot and neutral sides of the AC line are conductively coupled to the first and second output terminals for a first time interval; and a suppression circuit configured to suppress operation of the mis-wiring detection circuit when the hot and neutral sides of the AC line are conductively coupled to the first and second input terminals for a second time interval, wherein the second time interval is less than the first time interval.

2. The ground fault circuit interrupter of claim 1, wherein the mis-wiring detection circuit Is electrically coupled to the first and second output terminals both when the first and second sets of electrical contacts are In the open position and when the first and second sets of electrical contacts are in the closed position.

3. The ground fault circuit interrupter of claim 1, wherein the mis-wiring detection circuit outputs an interrupt signal to the circuit interrupter when the AC line is mistakenly conductively coupled to the output terminals, after the first and second sets of electrical contacts have transitioned from the open position to the closed position.

4. The ground fault circuit interrupter of claim 1, further comprising a mis-wiring notification mechanism for providing notification that a mis-wiring has occurred when the mis-wiring detection circuit outputs an interrupt signal and the circuit interrupter causes the first and second sets of electrical contacts to open.

5. The ground fault circuit interrupter of claim 4, wherein the mis-wiring notification mechanism is a react switch mechanically interconnected to the first and second sets of electrical contacts, and further wherein the notification of a rids-wiring occurs when the reset switch moves into a position indicative of a fault and cannot be reset.

6. The ground fault circuit interrupter of claim 1, further comprising a manual reset switch connected to the first and second sets of electrical contacts, the reset switch for selectively closing the first and second sets of electrical contacts after they have been opened by the circuit interrupter upon receiving an interrupt signal.

7. The ground fault circuit interrupter of claim 6, wherein the reset switch cannot close the first and second sets of electrical contacts for a substantial length of time while a mis-wiring exists.

8. The ground fault circuit interrupter of claim 1, further comprising a test switch for selectively electrically connecting the first conductive path to the second conductive path in a manner that results in a current imbalance indicative of a ground fault condition in order to test proper operation of the ground fault circuit interrupter.

9. A ground fault circuit interrupter (GFCI) mis-wiring detector, comprising:
  a GFCI comprising:
    a set of input terminals for an AC source;
    a set of output terminals for one or more AC loads;
    an electrical interconnection between the set of input terminals and the set of output terminals;
    a set of switches interposed between the set of input terminals and the set of output terminals on the electrical interconnection for selectively interrupting the electrical interconnection, a portion of the electrical interconnection extending between the set of input terminals and the set of switches, and another portion of the electrical interconnection extending between the set of switches and the set of output terminals;
    a ground fault detection circuit to detect a ground fault condition at one or more of the one or more AC loads;
    a switch actuator to open the set of switches when a ground fault is detected;
    a mis-wiring detection circuit configured to cause the switch actuator to open the set of switches when the AC source is mis-wired to the set of output terminals, even if there is no ground fault detected;
    a set of mis-wiring detection circuit contacts electrically coupling the mis-wiring detection circuit to a set of output nodes, the set of output nodes Including the set of output terminals and the portion of the electrical interconnection between the set of switches and the set of output terminals; and
    a suppression circuit electrically coupled to a set of input nodes, the set of input nodes including the set of input terminals and the portion of the electrical interconnection between the set of input terminal, and the set of switches, the suppression circuit configured to suppress operation of the mis-wiring detection circuit when the AC source is correctly wired to the set of input terminals.
  wherein the mis-wiring detection circuit causes the switch actuator to open the set of switches when the AC source is mis-wired to the set of output terminals alter a first time interval, and further where in the suppression circuit suppresses operation of the mis-wiring detection circuit when the AC source is correctly wired to the set of input terminals alter a second time interval, the second time interval being shorter than the first time interval.

10. The GFCI mis-wiring detector of claim 9, wherein the mis-wiring detection circuit and the suppression circuit are communicatively coupled but electrically isolated when the set of switches are open.

11. The GFCI mis-wiring detector of claim 10, wherein the electrical isolation and communicative coupling between the mis-wiring detection circuit and the suppression circuit are achieved using an opto-isolator.

12. The mis-wiring detector of claim 9, further a mis-wiring notification mechanism for providing notification that a mis-wiring has occurred when the mis-wiring detection circuit has caused the switch actuator to open the set of switches.

13. A ground fault circuit interrupter (GFCI) mis-wiring detector, comprising:
  a set of input terminals for an AC source;
  a set of output terminals for an AC load, the set of output terminals conductively connected to the set of input terminals;
  a GFCI circuit including one or more switches for selectively interrupting the connection between the set of input terminals and the set of output terminals when a ground fault occurs;
  a mis-wiring detection circuit for causing the one or more switches of the GFCI circuit to open when the AC source is electrically coupled to the set of output terminals for a first time interval, even if there is no imbalance in the current flow; and
  a suppression circuit for suppressing operation of the mis-wiring detection circuit when the AC source is electrically coupled to the input terminals for a second time interval, the second time interval being less than the first time interval.

14. The GFCI mis-wiring detector of claim 13, wherein the mis-wiring detection circuit is electrically coupled to the set of output terminals, even when the switches have interrupted the connection between the set of input terminals and the set of output terminals.

15. The GFCI mis-wiring detector of claim 13, wherein the suppression circuit is electrically coupled to the set of input terminals.

16. The GFCI mis-wiring detector of claim 13, wherein the mis-wiring detection circuit includes a first charging circuit, the time constant of the charging circuit at least partially affecting the first time interval.

17. The GFCI mis-wiring detector of claim 13, wherein the suppression circuit includes a second charging circuit, the time constant of the charging circuit at least partially affecting the second time interval.

18. The GFCI mis-wiring detector of claim 13, wherein the mis-wiring detection circuit and the suppression circuit are communicatively coupled but electrically isolated from each other when the one or more switches are open.

19. The GFCI mis-wiring detector of claim 18, wherein the electrical isolation and communicative coupling between the mis-wiring detection circuit and the suppression circuit are achieved using an opto-isolator.

20. The GFCI mis-wiring detector of claim 13, further comprising a mis-wiring notification mechanism for providing notification that a mis-wiring has occurred when the mis-wiring detection circuit causes the one or more switches of the GFCI circuit to open.

21. An integral AC receptacle and ground fault circuit interrupter (GFCI) for protecting the receptacle, comprising:
  a housing;
  a plurality of receptacle outlets mounted within the housing, each receptacle for receiving an AC cord plug from an AC load;
  a set of output terminals for optionally connecting the AC receptacle in parallel with a remote AC receptacle for which pound fault protection is desired;
  an electrical backplane adjacent to the housing for electrically interconnecting the plurality of receptacle outlets and the set of output terminals;
  a set of input terminals for connecting to an AC source;
  a GFCI circuit, interposed between the set of input terminals and the electrical backplane, the GFCI circuit establishing an interruptible electrical connection therebetween, the GFCI circuit including:
    a set of switches for interrupting the electrical connection between the set of input terminals and the electrical backplane;
    a solenoid for actuating the set of switches and thereby selectively interrupting the electrical connection between the set of input terminals arid the electrical backplane;
    at least one detector for sensing an imbalance in current flow between hot and neutral sides through the AC receptacle that ii indicative of a ground fault;
    a ground fault detection chip that, based on the imbalance in current flow sensed by the at least one detector outputs a SCR-triggering signal;
    a SCR for controlling operation of the solenoid that, upon receipt of the SCR-triggering signal from the ground fault detection chip, causes the solenoid to energize; and
    a rectifier for providing power to the GFCI circuit,
  a GFCI wiring detector, the detector comprising:
    an opto-Isolator including a phototransistor and a LED;
    a long-delay circuit electrically coupled to the LED of the opto-isolator, end to the electrical connection between the set of switches and the output terminals, the long-delay circuit including a charging circuit that begins charging when the AC source is electrically connected to the set of output terminals and, after a first time interval, actuates the phototransistor of the opto-isolator, causing:
      the ground fault detection chip to output a SCR-triggering signal, even if there is no imbalance in current flow;
      the SCR to trigger;
      the solenoid to energize;
      the set of switches to be actuated; and
      the electrical connection to be interrupted In response to the mis-wiring;
    a short-delay circuit electrically coupled to the phototransistor of the opto-isolator, and to the electrical connection between the set of switches and the input terminals, the short-delay circuit including a charging circuit that begins charging when the AC source is electrically connected to the set of input terminals and, after a second time interval, causes operation of the long-delay circuit to be suppressed by:
      actuating a shunt-to-ground transistor; and
      correspondingly, providing a circuit ground input to the phototransistor; wherein the second time Interval is shorter than the first time interval.

22. The integral AC receptacle and GFCI of claim 21, further comprising a manual reset switch connected to the set of switches of the GFCI circuit, and further wherein notification of a mis-wiring occurs when the manual reset switch trips and cannot be reset.

23. The integral AC receptacle and GFCI of claim 21, wherein the charging circuit of the long-delay circuit and the charging circuit of the short-delay circuit begin charging even if there is no AC load connected to the receptacle and no current flow through the hot and neutral sides of the AC receptacle.

24. A ground fault circuit Interrupter (GFCI) mis-wiring detector, comprising:
  a GFCI comprising:
    input connection means for electrically connecting the GFCI to an AC source;
    output connection means for electrically connecting the GFCI to one or more AC loads;
    ground fault circuit Interrupter means including:
      an electrical interconnection conductively coupling the input connection means and the output connection means;
      switching means interposed between the input connection means and the output connection means on the electrical interconnection for selectively interrupting the electrical interconnection, a portion of the electrical interconnection extending between the input Connection means and the switching means, and another portion of the electrical interconnection extending between the switching means and the output connection means.
      ground fault detection means for detecting an Imbalance in current flow between the input connection means and the output connection means indicative of a ground fault condition at one or more of the one or more AC loads;
      switching control means for opening the switching means in response to the detection of a ground fault condition;
      mis-wiring detection means for causing the switching control means to open the switching means when the AC source is electrically connected to the output connection means, even if there is no detected ground fault condition; and
      mis-wiring detection contact means electrically coupling the mis-wiring detection means to a set of output nodes, the set of output nodes comprising the output connection means and the portion of the electrical interconnection extending between the switching means and the output connection means
      wherein the mis-wiring detection means causes the switching control means to open the switching means when the AC source is mis-wired to the output connection means after a first time interval, and further where in the suppression means suppresses operation of the mis-wiring detection means when the AC source is correctly wired to the input connection means after a second time interval, the second time interval being shorter than the first time interval.

25. The GFCI mis-wiring detector of claim 24, further comprising:
suppression means electrically connected to a set of input nodes, the set of input nodes comprising the input connection means and the portion of the electrical interconnection extending between the switching means and the input connection means, the suppression means for suppressing operation of the mis-wiring detection means when the AC source is electrically connected to the input connection means.

26. The GFCI mis-wiring detector of claim 24, wherein the mis-wiring detection means and the suppression means are communicatively coupled but electrically isolated when the switching means are open.

27. The GFCI mis-wiring detector of claim 24, further comprising a mis-wiring notification means for providing notification that a mis-wiring has occurred when the mis-wiring detection means has caused the switching control means to open the switching means.

28. A method of detecting a mis-wiring of a ground fault circuit interrupter (GFCI), the GFCI including a set of input terminals for electrical connection to an AC source and a set of output terminals for electrical connection to an AC load, and the GFCI further including a detector for detecting a ground fault condition and a set of switches that when closed permit an electrical current to flow between the set of input terminals and the set of output terminals, and when open prevents the flow of the electrical current between the sets of input terminals and the set of output terminals, the method comprising:
attaching the AC source to a set of terminals selected from a group consisting of the set of output terminals and the set of input terminals,
closing the set of switches to apply the source to both a mis-wiring detection circuit and a suppression circuit;
generating an interrupt signal output from the mis-wiring detection circuit after the AC source has been electrically connected to the set of outputs for a first time interval, the interrupt signal opening the set of switches;
generating a suppression signal output from the suppression circuit after the AC source has been electrically connected to the set of inputs for a second time interval, wherein the second time interval is shorter than the first time interval, the suppression signal suppressing the interrupt signal; and
detecting a mis-wiring of the AC source to the input terminals by opening the set of switches in response to a suppressed interrupt signal that is generated before the second time interval elapses and a suppression signal is generated, and that is caused by the mis-wiring detection circuit remaining connected to the AC source when the set of switches is open.

* * * * *

UNITED STATES PATENT AND TRADEMARK OFFICE
CERTIFICATE OF CORRECTION

PATENT NO. : 6,850,394 B2
APPLICATION NO. : 10/226529
DATED : February 1, 2005
INVENTOR(S) : Kim It is certified that error appears in the above-identified patent and that said Letters Patent is hereby corrected as shown below:

At Claim 2 Column 14, line 63, delete "Is" and insert --is --.

At Claim 2 Column 14, line 65, delete "In" and insert -- in --.

At Claim 9 Column 15, line 62, delete "Including" and insert -- including --.

At Claim 9 Column 16, line 2, delete "terminal", insert the word -- terminals --.

At Claim 9 Column 16, line 6, after "terminal." insert the word --terminal, --.

At Claim 12 Column 16, line 24, after "The", insert the word --GFCI --.

At Claim 12 Column 16, line 24, after "further", insert the word --comprising --.

At Claim 11 Column 17, line 20, delete "pound" and insert -- ground --.

At Claim 13 Column 17, line 35, delete "arid" and insert -- and --.

At Claim 13 Column 17, line 39, delete "ii" and insert --is --.

At Claim 13 Column 17, line 47, after "circuit", please add --:--.

At Claim 13 Column 17, line 49, delete "opto-isolator" and insert -- opto-isolator --.

At Claim 14 Column 17, line 51, delete "end" and insert --and--.

At Claim 17 Column 17, line 64, delete "In" and insert --in --.

At Claim 21 Column 18, line 9, delete "Interval" and insert --interval --.

At Claim 23 Column 18, line 22, delete "Interrupter" and insert --interrupter --.

At Claim 24 Column 18, line 29, delete "Interrupter" and insert --interrupter --.

At Claim 24 Column 18, line 38, delete "Connection" and insert --connection --.

At Claim 24 Column 18, line 43, delete "Imbalance" and insert -- imbalance --.

At Claim 28 Column 20, line 8, after "to apply the", please insert -- AC --.

UNITED STATES PATENT AND TRADEMARK OFFICE
CERTIFICATE OF CORRECTION

PATENT NO.        : 6,850,394 B2
APPLICATION NO. : 10/226529
DATED             : February 1, 2005
INVENTOR(S)       : Kim It is certified that error appears in the above-identified patent and that said Letters Patent is hereby corrected as shown below:

At Claim 28 Column 20, line 24, delete "a suppressed" and insert -- an unsuppressed --.

Signed and Sealed this

Fourteenth Day of August, 2007

JON W. DUDAS
*Director of the United States Patent and Trademark Office*